(12) United States Patent
Teichmann et al.

(10) Patent No.: US 6,637,348 B1
(45) Date of Patent: Oct. 28, 2003

(54) LEVEL-ADJUSTABLE MAIN SPRING AND ACTIVELY BIASED EMERGENCY SPRING WITH FAIL-SAFE BEHAVIOR

(75) Inventors: Martin Teichmann, Graz (AT); Herwig Waltensdorfer, Graz (AT); Hans Hödl, Graz (AT); Alexander Schimanofsky, Graz (AT)

(73) Assignee: Siemens SGP Verkehrstechnik GmbH, Vienna (AT)

( * ) Notice: Subject to any disclaimer, the term of this patent is extended or adjusted under 35 U.S.C. 154(b) by 0 days.

(21) Appl. No.: 10/188,358

(22) Filed: Jul. 2, 2002

(51) Int. Cl.$^7$ ................................................ B61F 5/00
(52) U.S. Cl. ..................................... 105/453; 105/199.1
(58) Field of Search .................... 105/199.1, 199.2, 105/199.3, 453; 280/5.501, 5.503, 5.514, 5.519

(56) References Cited

U.S. PATENT DOCUMENTS

| | | | |
|---|---|---|---|
| 3,012,521 A | * 12/1961 | Lich | 105/141 |
| 4,428,302 A | * 1/1984 | Herring, Jr. | 105/198.1 |
| 4,468,050 A | * 8/1984 | Woods et al. | 280/5.514 |
| 5,588,368 A | * 12/1996 | Richter et al. | 105/199.1 |
| 6,102,378 A | * 8/2000 | Gieseler et al. | 267/34 |
| 6,249,728 B1 | * 6/2001 | Streiter | 701/37 |

* cited by examiner

Primary Examiner—Mark T. Le
(74) Attorney, Agent, or Firm—Thomas R. Vigil; Welsh & Katz, Ltd.

(57) ABSTRACT

The rail car (1) with a substructure (2) and a car body (3) arranged thereon having a main suspension system (4) on a fluid basis is provided with at least one strut (5) supporting the car body (3) against the substructure (2). The pressure prevailing in the strut being correlated to the weight of the car body, and at least one emergency spring (6) supports the car body (3) against the substructure (2) in case of a failure of the main suspension (4). The at least one emergency spring (6) is biased and maintained in normal operation position (FIGS. 1, 2) by a force (F) generated by the pressure (p) prevailing in the strut (5). The emergency spring (6) expands from the normal operation position into an emergency operation position (FIG. 3) in which it resiliently supports the car body (3) in case of a failure of the main suspension system (4).

12 Claims, 5 Drawing Sheets

LEVEL-ADJUSTABLE MAIN SPRING AND ACTIVELY BIASED EMERGENCY SPRING WITH FAIL-SAFE BEHAVIOR

BACKGROUND OF THE INVENTION

1. Field of the Invention.

The present invention relates to a rail car with a substructure and a car body arranged thereon having a main suspension system on a fluid basis provided with at least one strut supporting the car body against the substructure, the pressure prevailing in said strut being correlated to the weight of the car body, and at least one emergency spring supporting the car body against the substructure in case of a failure of the main suspension.

2. Description of the Prior Art.

With rail cars of the type mentioned herein above, it may happen that, on entering a station, the level of the floor arranged in a car body is higher than the platform level in the station. Due to the level difference between the station and the upper edge of the floor in the car body, a step may form in the area of transition between the rail car and the station.

With rail cars intended for passenger service mainly, these steps may pose a considerable safety risk for passengers, this being the reason why level adjustment may be carried out. For this purpose, the car body is usually lowered into an active main spring arranged between the car body and the chassis by reducing the dynamic spring travel. However, the reduction of the dynamic spring travel of the active spring involves the risk that, upon failure of a level adjustment, the dynamic spring travel available does no longer suffice to ensure safe driving. Accordingly, driving is no longer possible upon failure of conventional level adjustments. To circumvent the problem just mentioned, certain known level adjustments for rail cars are provided, together with the active spring, with a passive emergency:spring that is intended to allow for sufficient suspension travel of the car body in case of a failure of the active spring.

A rail car of the type mentioned herein above is disclosed in WO 94/22702 A1 for example. The known rail car is provided with a hydraulic strut arranged between the car body and the substructure. To lower the car body, the dynamic spring travel of the active strut can be reduced by discharging oil into a spring chamber. DE 198 15 197 C1 also describes that, on a pressure drop, the car can be lowered onto an emergency spring. Like with all of the other known level adjustment systems using an emergency spring in addition to an active spring, the disadvantage of this embodiment is that the travel of the active spring is limited by the emergency spring in "downward"direction toward the chassis so that it may happen that the car body cannot be completely lowered to the platform level of a station while passengers are getting into and out of the car for example.

When the level of the platform's upper edge (FOK) in a station is so low that, on lowering the car body onto the FOK, there is no dynamic spring travel left, the problem arising is that, upon failure of conventional level adjustment systems, the derailment safety of the rail car is no longer provided. Furthermore, the action of lowering the car body is usually restricted by the "emergency position"of the emergency spring in operation.

BRIEF SUMMARY OF THE INVENTION

It is therefore an object of the invention to overcome the above mentioned disadvantages.

According to the invention, the solution to this object is achieved with a rail car of the type mentioned herein above in which at least one emergency spring is biased and maintained in normal operation position (FIG. 1, 2) by the force generated by the pressure prevailing in the strut, the emergency spring expanding from said normal operation position into an emergency operation position (FIG. 3) in which it resiliently supports the car body in case of a failure of the main suspension system.

In the invention, the emergency spring is always biased as long as the main spring is intact, thus requiring less space than a conventionally arranged emergency spring. The distance by which a strut of the main suspension system can be lowered in a station increases as a result thereof. Upon failure of the main suspension system, the emergency spring expands and supports the car body against the substructure, thus allowing to maintain safe driving operation.

In a preferred variant of the invention there is provided that the at least one emergency spring is accommodated in a housing comprised of an outer part connected to the car body or the substructure and of an inner part which is carried so as to be slidable in vertical direction within the outer part and carries the emergency spring, said two parts forming at least one pressure chamber filled with a fluid and bounded, at least in sections, in the direction of action of the emergency spring, by a projection of the outer part and by a projection of the inner part located opposite said outer part.

Furthermore, the loads between the at least one emergency spring and the strut may be coupled.

In an advantageous embodiment, the spring travel of the emergency spring can be limited by a catch; said catch can be formed by the base of the outer part of the housing.

Moreover, the emergency spring can be biased to block when in normal operation position and a load transmission can be provided between the strut and the emergency spring.

The emergency spring can be connected in parallel or in series with the main suspension system.

BRIEF DESCRIPTION OF THE SEVERAL VIEWS OF THE DRAWINGS

The invention and its advantages will be explained in closer detail in the following non restrictive description of embodiments thereof, given by way of example only with reference to the schematic drawing.

DETAILED DESCRIPTION OF THE INVENTION

Figure 1:
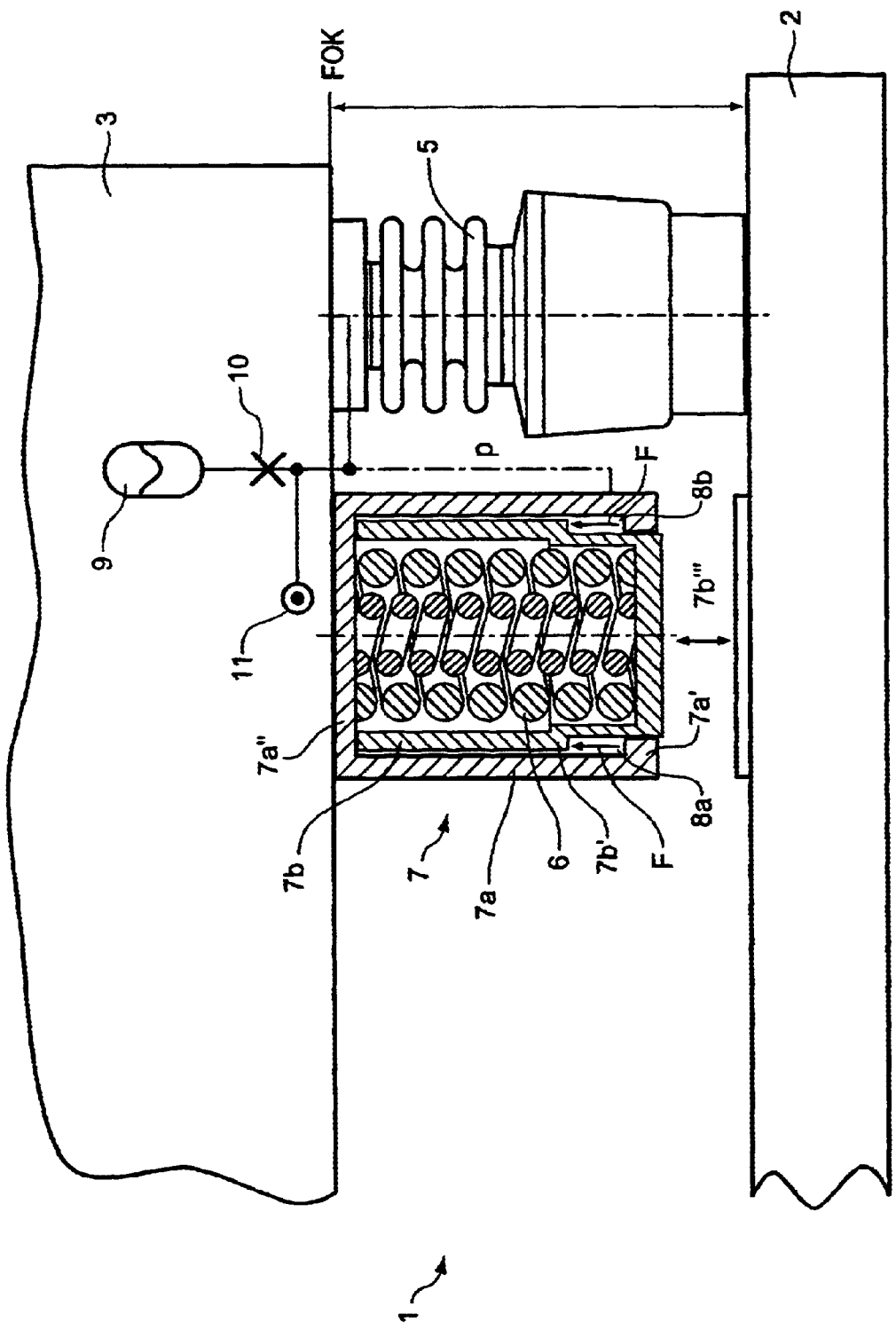
FIG. 1 is a detail of a first variant of a rail car in accordance with the invention with an emergency spring in a normal operation position.

According to FIG. 1, a rail car 1 in accordance with the invention is provided with a substructure 2 and with a car body 3 arranged thereon. A hydro-pneumatic or pneumatic main spring 4 is provided between the car body 3 and the substructure 2, said main spring supporting the car body 3 against substructure 2 by means of one or several strut(s) 5 filled with a fluid, with oil for example. A pressure p is generated in the fluid of the strut 5 by the weight of the car body 3.

Furthermore, there are provided one or several emergency springs 6 that support the car body 3 against the substructure in case of a failure of the main suspension system 4. By means of said main suspension system 4, the level of the car body 3 can be lowered relative to the platform's upper edge in a station (FIG. 2), a reservoir being indicated at 9, a throttle at 10 and an oil supply at 11.

Such level adjusting suspension systems are widely known to those skilled in the art and are described for example in WO 94/22702 A1 cited herein above and will therefore not be discussed in closer detail herein.

According to the invention, the emergency spring 6 is connected to the strut 5 through a load coupling connection. The emergency spring is biased in a normal operation position by a force F generated by the pressure p prevailing in the strut, and the emergency spring 6 can expand from said normal operation position into an emergency operation position (FIG. 3) in which the emergency spring 6 resiliently supports the car body 3 in case of a pressure drop in the strut 5. In biasing the emergency spring 6, the latter can be dimensioned in such a manner that the spring travel available suffices to ensure safe driving when it has expanded in the emergency operation position.

As shown in the FIGS. 1 through 7, the emergency spring may be a helical spring for this purpose. The helical spring is preferably made from steel as such springs have the lowest deflection.

Figure 2:
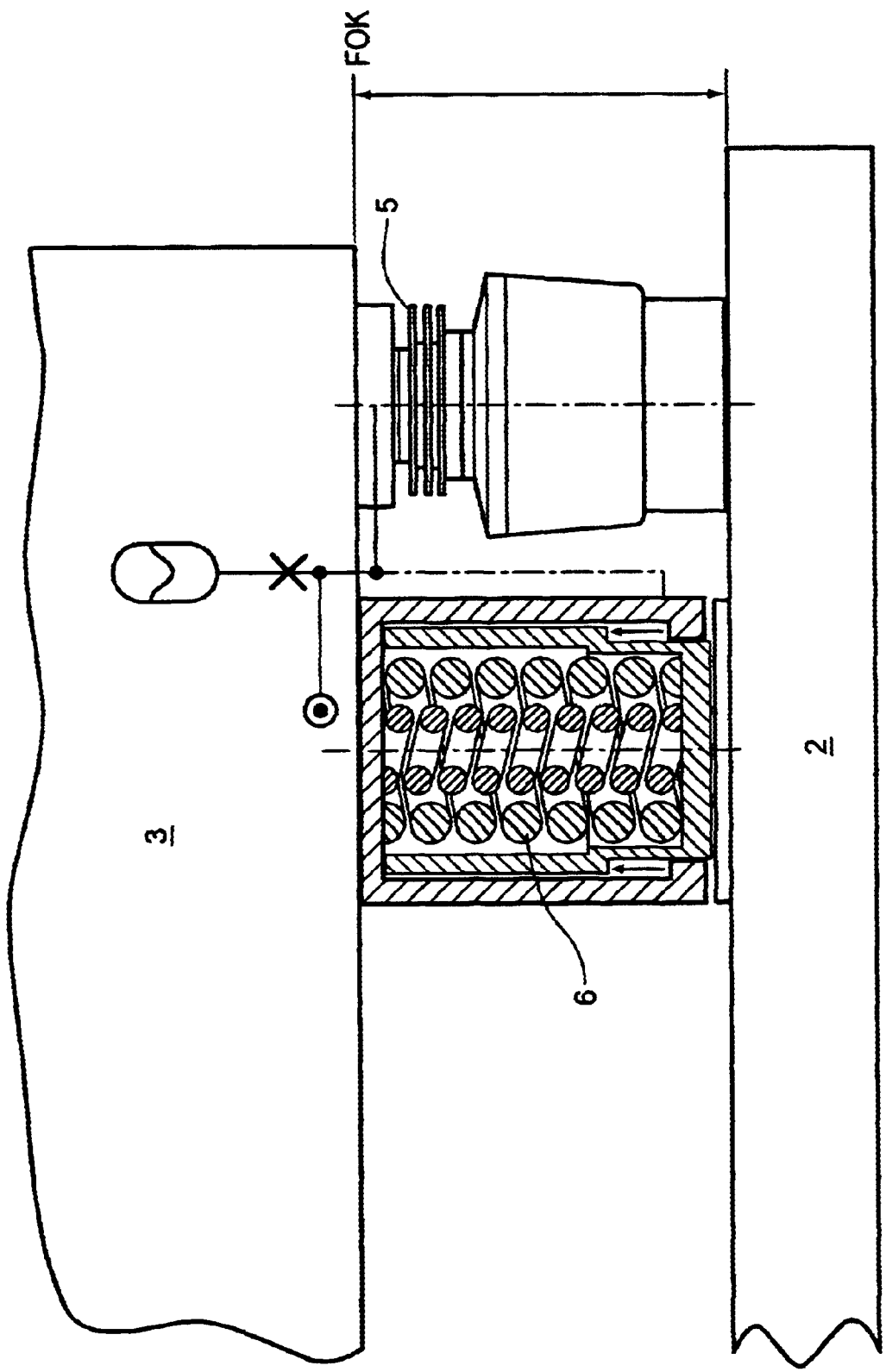
FIG. 2 snows the rail car of FIG. 1 in a lowered position.
Figure 3:
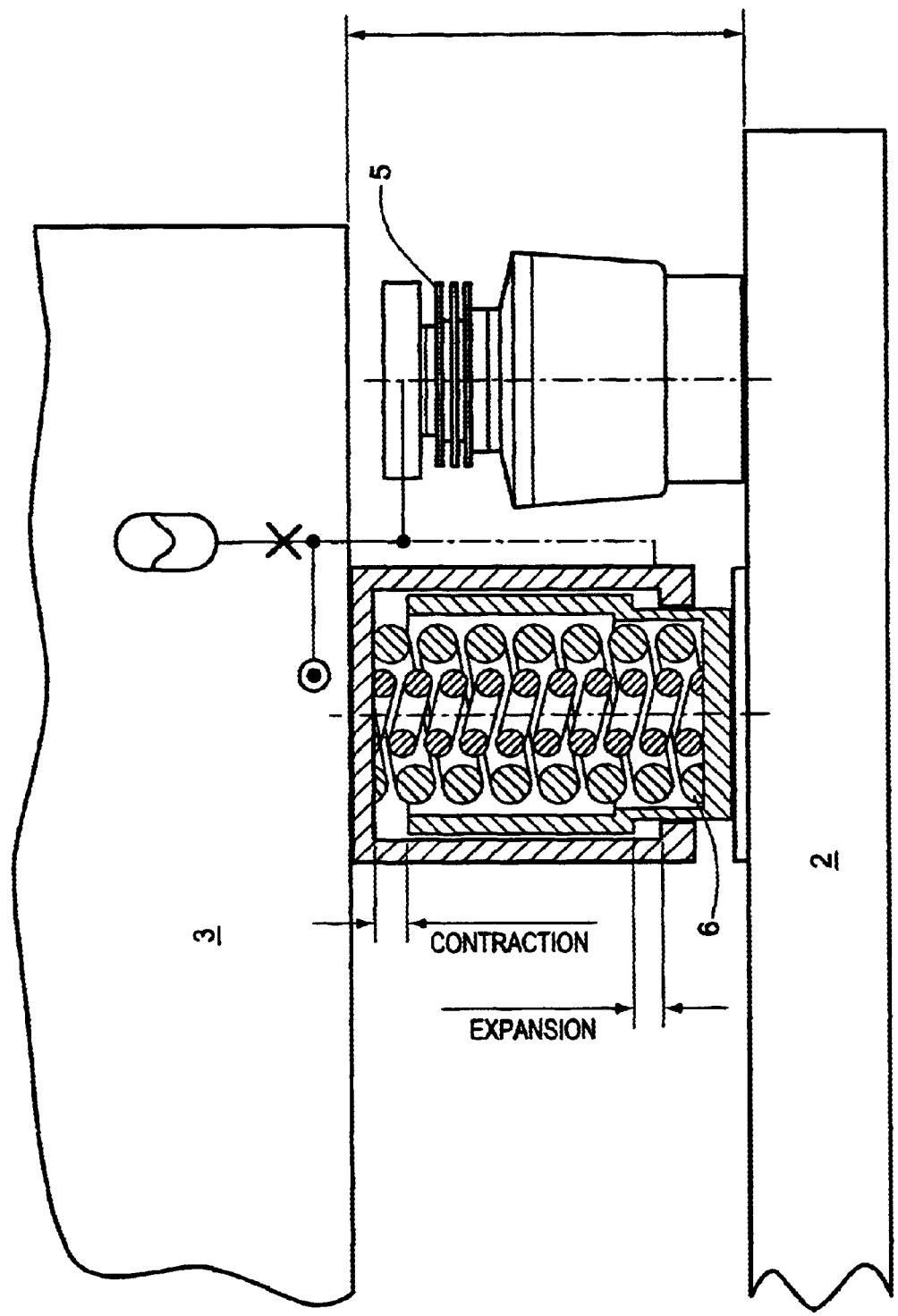
FIG. 3 shows the rail car of FIG. 2 with an emergency spring in an emergency operation position.

According to the FIGS. 1 through 3, the emergency spring 6 can be accommodated in a housing 7 that may be provided with a first part 7a connected to the car body 3 or the substructure 2 and with a second part 7b which is carried within the first part 7a so as to be slidable in vertical direction. The second part 7b thereby carries the emergency spring 6.

The two parts 7a, 7b may form or bound one or several pressure chamber(s) 8a, 8b filled with a fluid, with oil for example. The pressure chamber 8a, 8b may be bounded, at least in sections in the direction of the action w of the emergency spring 5, by a projection 7a' of the outer part 7a, which is for example formed in a ring-shaped and flat configuration, and by a projection 7b' of the inner part 7b, which is also shaped like a ring and located opposite the projection 7a'. In the exemplary embodiment illustrated in this FIG., the pressure chamber 8a, 8b forms a ring located between the parts 7a, 7b.

Moreover, pressure chamber 8a, 8b may be connected through a line filled with a fluid to the interior of strut 5 so that substantially the same pressure prevails in the pressure chamber 8a, 8b and in the interior of strut 5. Due to the pressure exerted onto the projection 7b' of inner part 7b, said part 7b is urged toward the car body 3, the helical spring carried in said part 7b being biased as a result thereof. If an accordingly small size is chosen for the surface area of the projection 7b', a large force F can be generated in the pressure chamber 8a, 8b for biasing the emergency spring.

It is however also possible to provide, between strut 5 and pressure chamber 8a, 8b, a hydraulic force amplifier so that a high enough pressure or a high enough force F can be generated in the pressure chamber 8a, 8b for tensioning the emergency spring 6 even if the car body 3 is subjected to little load.

If the pressure in the strut 5 drops or if the main suspension system 4 fails, the force F in the pressure chamber decreases and the emergency spring 6 can expand, in accordance with FIG. 3, into an emergency operation position in which it supports the car body 3 against the substructure. In the embodiment illustrated herein, the spring travel of emergency spring 6 in the emergency operation position is mainly determined by the height of the pressure chamber 8a, 8b.

The first part 7a of housing 7 may be configured to substantially form a cylinder that is at least in sections open at one of its bases. The second part 7b of housing 7 can thereby be provided with a body 7b" shaped like a cylinder jacket. Furthermore, the inner part 7b can be provided with a cylinder 7b''' arranged concentrically relative to the body 7b" shaped like a cylinder jacket and adjacent said body 7b" shaped like a cylinder jacket, said cylinder 7b''' being open at its side facing said body 7b". The projection 7b' of body 7b" can support the cylinder 7b'''(FIGS. 1 through 3).

Figure 4:
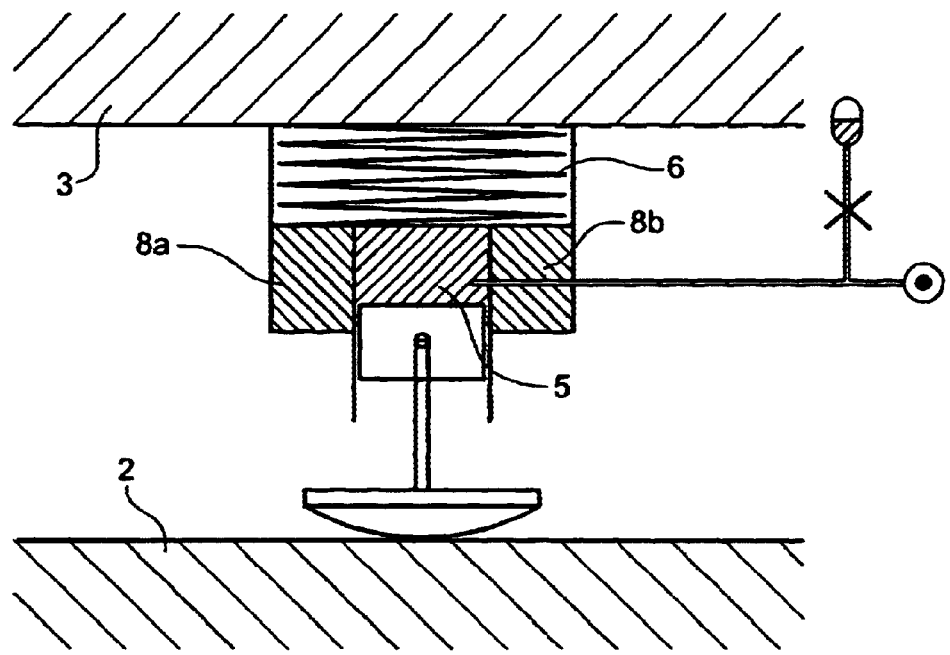
FIG. 4 shows a second variant of a rail car of the invention.

As shown in FIG. 4, the emergency spring 6 may also be configured to form one constructional unit with strut 5 and can be arranged above or beneath strut 5. Pressure chamber 8a, 8b and strut 5 can be directly interconnected with each other.

Figure 5:
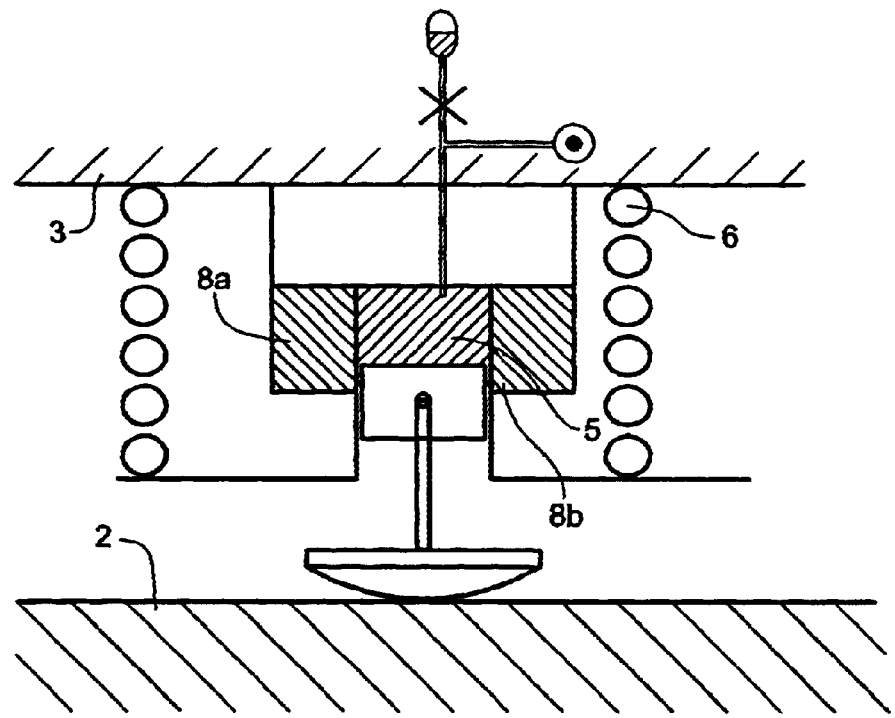
FIG. 5 shows a third variant of a rail car of the invention.
Figure 6:
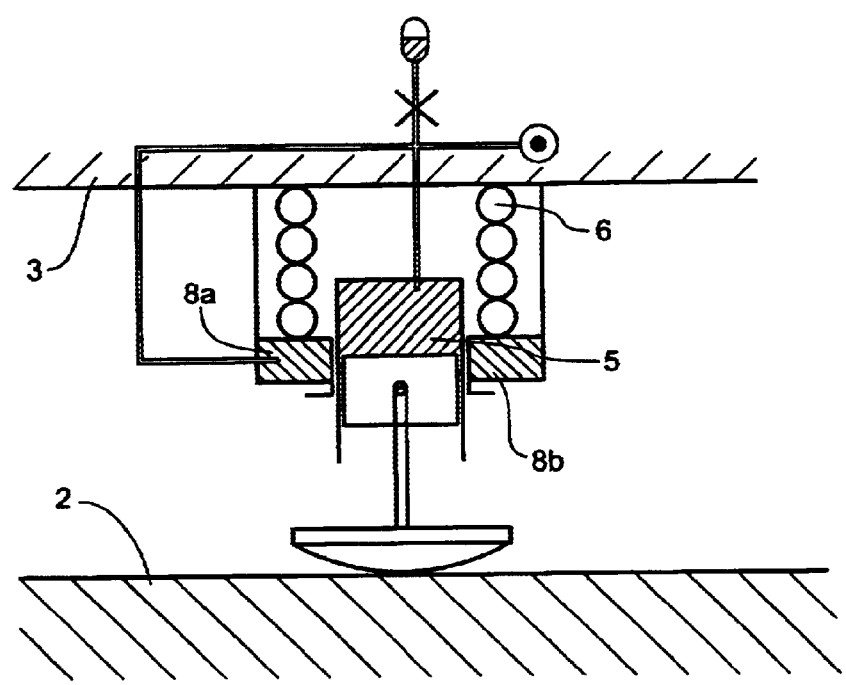
FIG. 6 shows a fourth variant of a rail car of the invention.

The emergency spring 6 and the strut 5 may also be positioned concentrically relative to each other as illustrated in the FIGS. 5 and 6.

In one preferred variant of the invention, the emergency spring is biased to "block", as depicted for example in the FIGS. 1 and 2, meaning, the emergency spring 6 is compressed to its maximum load capacity in its normal operation position and maintained in this position by the force F. The housing 7, or the height of the inner part 7b, can be chosen so that part 7b abuts on the outer part when the emergency spring 6 is not compressible any further. Accordingly, in the embodiment shown, the base 7a" of the outer part 7a forms an abutment for the emergency spring 6. The embodiment of the housing just described permits to realize a particularly compact and well functioning form of an "emergency spring cartridge".

Figure 7:
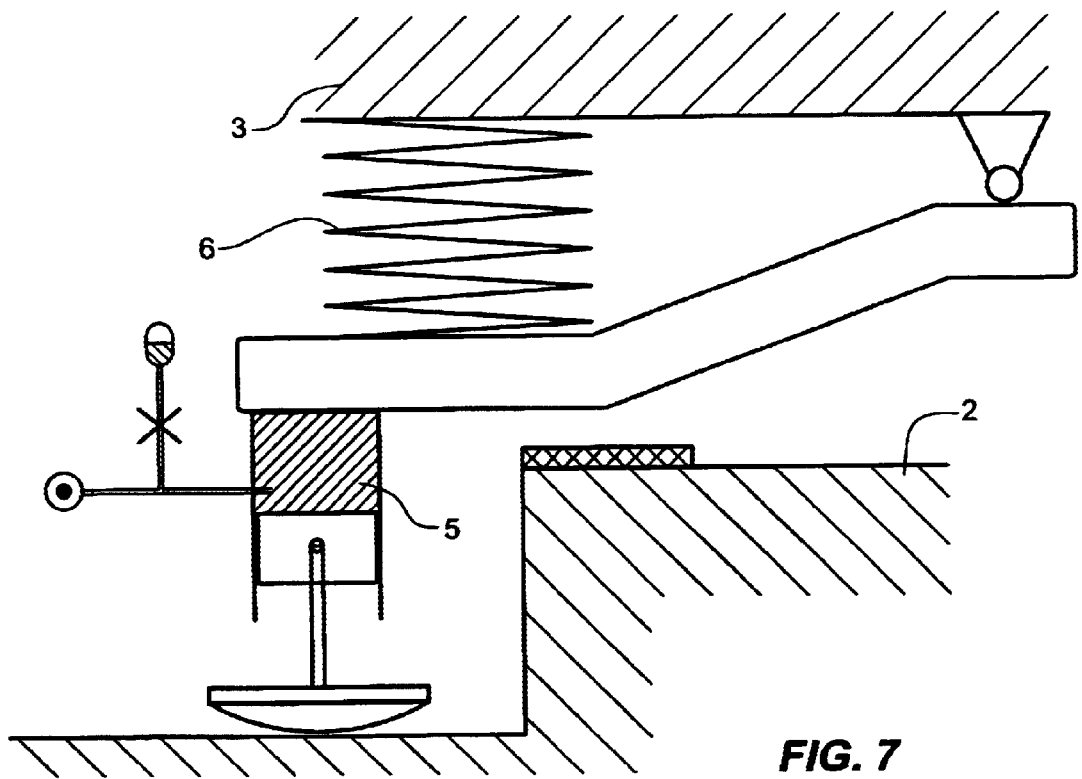
FIG. 7 shows a fifth variant of a rail car of the invention.

The emergency spring and the main suspension system 4 can be connected in series in accordance with FIG. 5 or in parallel in accordance with FIG. 6. As shown in FIG. 7, a mechanical load transfer is also possible in principle. The embodiments shown are to be considered only as illustrative and not restrictive.

We claim:

1. A rail car (1) with a substructure (2) and a car body (3) arranged thereon having a main suspension system (4) on a fluid basis provided with at least one strut (5) supporting the car body (3) against the substructure (2), a pressure prevailing in said strut being correlated to the weight of the car body, and at least one emergency spring (6) supporting the car body (3) against the substructure (2) in case of a failure of the main suspension system (4), characterized in that the at least one emergency spring (6) is biased and maintained in normal operation position (FIG. 1, 2) by a force (F) generated by the pressure (p) prevailing in the strut (5), the emergency spring (6) expanding from said normal operation position into an emergency operation position (FIG. 3) in which it resiliently supports the car body (3) in case of a failure of the main suspension system (4).

2. The rail car according to claim 1, characterized in that the at least one emergency spring (6) is accommodated in a housing (7) comprised of a first part (7a) connected to the car body (3) or the substructure (2) and of a second part (7b) which is carried so as to be slidable in vertical direction within said first part (7a) and carries the emergency spring (6), said two parts (7a, 7b) forming at least one pressure chamber (8a, 8b) filled with a fluid and bounded, at least in sections, in the direction of action (w) of the emergency spring (6), by a projection (7a') of the outer part (7a) and by a projection (7b') of the inner part (7b) located opposite said outer part.

3. The rail car according to claim 1, characterized in that loads between the at least one emergency spring (6) and the strut (5) are coupled.

4. The rail car according to claim 1, characterized in that the spring travel of the emergency spring (6) is limited by a catch.

5. The rail car according to claim 4, characterized in that the catch is formed by a base (7a") of an outer part (7a) of a housing (7) that accommodates the emergency spring (6).

6. The rail car according to claim 5, characterized in that the emergency spring (6) is biased to block when in normal operation position.

7. The rail car according to claim 1, characterized in that a load transmission is provided between the strut (5) and the emergency spring (6).

8. The rail car according to claim 1, characterized in that the emergency spring (6) is connected in parallel with the main suspension system (4).

9. The rail car according to claim 1, characterized in that the emergency spring (6) is connected in series with the main suspension system (4).

10. The rail car according to claim 1, characterized in that, in the normal operation position, the emergency spring (6) is biased in such a manner that the strut (5) is substantially lowerable by the entire travel of the strut (5).

11. The rail car according to claim 1, characterized in that the emergency spring (6) is a helical spring.

12. The rail car according to claim 1, characterized in that the emergency spring (6) is made of steel.

\* \* \* \* \*